United States Patent
Desdier et al.

(10) Patent No.: US 10,165,390 B2
(45) Date of Patent: Dec. 25, 2018

(54) METHODS, SYSTEMS, AND COMPUTER READABLE MEDIA FOR MANAGEMENT OF PASSIVE NETWORK TAPS USING RADIO FREQUENCY IDENTIFICATION (RFID)

(71) Applicant: Ixia, Calabasas, CA (US)

(72) Inventors: Marcel Felix Desdier, Pleasanton, CA (US); Larry Allan Campbell, Campbell, CA (US); Siuman Hui, Millbrae, CA (US)

(73) Assignee: KEYSIGHT TECHNOLOGIES SINGAPORE (HOLDLNGS) PTE. LTD., Singapore (SG)

( * ) Notice: Subject to any disclaimer, the term of this patent is extended or adjusted under 35 U.S.C. 154(b) by 48 days.

(21) Appl. No.: 15/067,128

(22) Filed: Mar. 10, 2016

(65) Prior Publication Data
US 2017/0265021 A1   Sep. 14, 2017

(51) Int. Cl.
*H04B 10/07* (2013.01)
*H04W 4/00* (2018.01)
*H04W 4/80* (2018.01)

(52) U.S. Cl.
CPC ............ *H04W 4/008* (2013.01); *H04B 10/07* (2013.01); *H04W 4/80* (2018.02)

(58) Field of Classification Search
None
See application file for complete search history.

(56) References Cited

U.S. PATENT DOCUMENTS

| 4,491,971 A | 1/1985 | Webb et al. |
| 5,251,907 A | 10/1993 | Ady |
| 5,929,777 A | 7/1999 | Reynolds |

(Continued)

FOREIGN PATENT DOCUMENTS

| EP | 2 778 627 A2 | 9/2014 |
| WO | WO 2013/020110 A2 | 2/2013 |
| WO | WO 2014/144948 A1 | 9/2014 |

OTHER PUBLICATIONS

"Flat-Out, The Thinnest 8 Station GigaBit Fiber Tap HD8," Net Optics, Inc. (Feb. 25, 2012). https://www.netoptics.com/products/network-taps/gigabit-fiber-tap-hd8.

(Continued)

*Primary Examiner* — Ken N Vanderpuye
*Assistant Examiner* — David Lambert

(57) ABSTRACT

According to one system, the system includes a chassis defining an enclosure and containing one or more slots. The system further includes a radio frequency identification (RFID) reader module comprising at least one processor and one or more RFID readers located within the enclosure, wherein the one or more RFID readers are configured to read data stored in RFID tags associated with one or more unpowered network taps. The RFID reader module is configured to receive, from a first RFID reader associated with a first slot of the chassis, information regarding a first unpowered network tap in the first slot, to determine, using a known location of the first RFID reader, a slot identifier associated with the first unpowered network tap, wherein the slot identifier indicates that the first unpowered network tap is in the first slot, and to provide the information and the slot identifier to a management system.

18 Claims, 5 Drawing Sheets

(56) References Cited

U.S. PATENT DOCUMENTS

| | | | |
|---|---|---|---|
| 6,088,586 A | 7/2000 | Haverty | |
| 7,248,933 B2 | 7/2007 | Wildman | |
| 7,317,377 B2 | 1/2008 | Galperin et al. | |
| 7,356,679 B1 | 4/2008 | Le et al. | |
| 7,605,699 B2 | 10/2009 | Tanaka | |
| 7,648,070 B2 | 1/2010 | Droms et al. | |
| 7,848,905 B2 | 12/2010 | Troxler et al. | |
| 7,890,723 B2 | 2/2011 | LaPedis et al. | |
| 7,934,660 B2 | 5/2011 | Yeakley et al. | |
| 8,395,506 B2 | 3/2013 | Elledge | |
| 8,954,292 B2 | 2/2015 | Troxler | |
| 9,173,066 B1 | 10/2015 | Jain et al. | |
| 9,614,614 B2 | 4/2017 | Bergeron | |
| 9,696,343 B2 | 7/2017 | Ripp et al. | |
| 2001/0034223 A1 | 10/2001 | Rieser et al. | |
| 2003/0034887 A1 | 2/2003 | Crabtree et al. | |
| 2006/0074513 A1 | 4/2006 | DeRose et al. | |
| 2007/0020969 A1* | 1/2007 | Yungers | G06K 7/10316 439/77 |
| 2007/0121649 A1* | 5/2007 | Cicchetti | H04B 10/1149 370/401 |
| 2008/0129459 A1 | 6/2008 | Bailly et al. | |
| 2009/0091442 A1* | 4/2009 | Howarth | G06Q 10/08 340/539.11 |
| 2009/0207027 A1 | 8/2009 | Banerjee et al. | |
| 2010/0127828 A1 | 5/2010 | Connolly et al. | |
| 2011/0050421 A1* | 3/2011 | Duron | G01S 13/589 340/572.1 |
| 2012/0005344 A1* | 1/2012 | Kolin | H05K 7/20836 709/226 |
| 2013/0215467 A1 | 8/2013 | Fein et al. | |
| 2013/0308229 A1 | 11/2013 | Faxvog et al. | |
| 2014/0281304 A1 | 9/2014 | Hoffman | |
| 2015/0125144 A1 | 5/2015 | Bergeron | |
| 2016/0025784 A1 | 1/2016 | Ripp et al. | |

OTHER PUBLICATIONS

Notice of Allowance and Fee(s) Due for U.S. Appl. No. 14/199,502 (dated Jul. 7, 2016).

Non-Final Office Action for U.S. Appl. No. 14/199,502 (dated Jan. 4, 2016).

Wessel, Rhea, "T-Systems, Intel Test RFID to Track Servers at Model Data Center," RFID Journal, pp. 1-2 (Feb. 2012).

Thibodeau, Patrick, "Finding lost IT with RFID," Computerworld, pp. 1-3 (Oct. 2010).

Commonly-assigned, co-pending U.S. Appl. No. 15/589,617 for "Providing Computing Device Configuration Information Via a Light Transmission," (Unpublished, filed May 8, 2017).

Notice of Allowance and Fee(s) Due for U.S. Appl. No. 14/199,502 (dated Dec. 7, 2016).

* cited by examiner

METHODS, SYSTEMS, AND COMPUTER READABLE MEDIA FOR MANAGEMENT OF PASSIVE NETWORK TAPS USING RADIO FREQUENCY IDENTIFICATION (RFID)

TECHNICAL FIELD

The subject matter described herein relates to management of passive network taps. More specifically, the subject matter relates to methods, systems, and computer readable media for management of passive network taps using radio frequency identification (RFID).

BACKGROUND

Network operators generally test network nodes prior to deploying them in live networks. However, even with prior testing, sometimes live networks may experience various issues that need to be debugged or diagnosed and quickly resolved. Such issues can be expensive, time consuming, and resource intensive to diagnose and resolve. To help with monitoring and/or debugging networks, network operators may deploy network taps, including passive network taps that do not require a power source, for copying link data and for providing the copied data to various sources for analysis. While passive network taps can be useful for monitoring and/or debugging networks, issues can arise when network operators want to gather information (e.g., presence and/or location information) about deployed passive network taps.

SUMMARY

Methods, systems, and computer readable media for management of passive network taps using radio frequency identification (RFID) are disclosed. According to one method for obtaining information regarding unpowered network taps, the method occurs at a chassis defining an enclosure and containing one or more slots. The chassis is associated with a radio frequency identification (RFID) reader module comprising one or more RFID readers located within the enclosure, wherein the one or more RFID readers are configured to read data stored in RFID tags associated with one or more unpowered network taps located in the one or more slots for passively copying data in a network. The method includes receiving, from a first RFID reader associated with a first slot of the chassis, information regarding a first passive network tap in the first slot. The method also includes determining, using a known location of the first RFID reader, a slot identifier associated with the first passive network tap. The slot identifier indicates that the first passive network tap is in the first slot. The method further includes providing the information and the slot identifier to a management system.

According to one system for obtaining information regarding unpowered network taps, the system includes a chassis defining an enclosure and containing one or more slots. The system also includes one or more unpowered network taps located in the one or more slots for passively copying data in a network. The system further includes a radio frequency identification (RFID) reader module comprising at least one processor and one or more RFID readers located within the enclosure, wherein the one or more RFID readers are configured to read data stored in RFID tags associated with one or more unpowered network taps. The RFID reader module is configured to receive, from a first RFID reader associated with a first slot of the chassis, information regarding a first unpowered network tap in the first slot, to determine, using a known location of the first RFID reader, a slot identifier associated with the first unpowered network tap, wherein the slot identifier indicates that the first unpowered network tap is in the first slot, and to provide the information and the slot identifier to a management system.

According to one system for providing information regarding an unpowered network tap, the system includes an unpowered network tap for passively copying data in a network. The system also includes an RFID tag coupled to the unpowered network tap, wherein the RFID tag includes information regarding the unpowered network tap.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including at least one processor, network interface, and/or memory.

As used herein, each of the terms 'function', 'engine', and 'module' refers to hardware or firmware, which may also include software, for implementing the feature(s) being described.

BRIEF DESCRIPTION OF THE DRAWINGS

The subject matter described herein will now be explained with reference to the accompanying drawings of which.

DETAILED DESCRIPTION

Figure 1A:
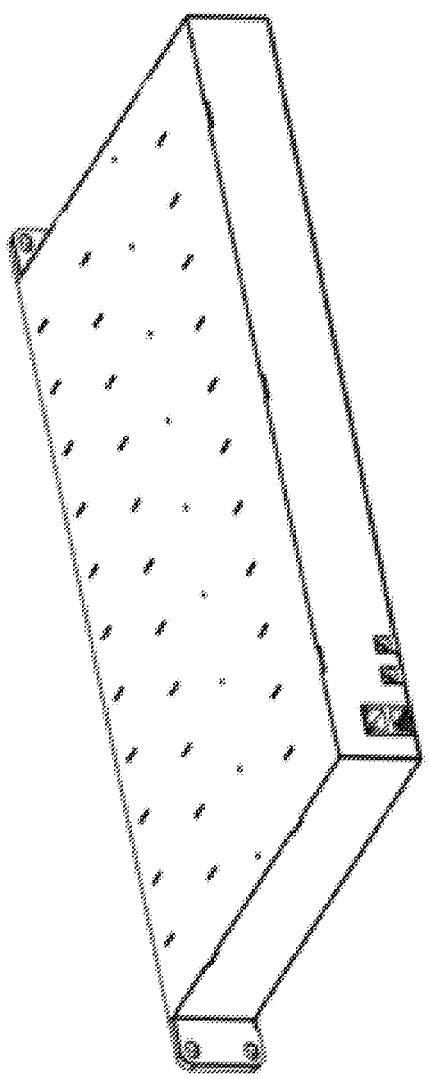
FIGS. 1A-1B are diagrams illustrating a chassis according to an embodiment of the subject matter described herein.

The subject matter described herein relates to methods, systems, and computer readable media for management of passive network taps using radio frequency identification (RFID). Active taps, bypasses, and other visibility equipment may be managed through Ethernet connections and inventory management systems, as these devices are typically powered and therefor have the potential for communications with the outside world via a powered communications module (e.g., an Ethernet chipset, etc.). However, passive network taps are generally invisible to such management systems since passive network taps are not powered. As such, quickly determining how many passive network taps are deployed in a chassis, a site, or a network may be difficult or near impossible.

In accordance with some aspects of the subject matter described herein, equipment, techniques, methods, or mechanisms are disclosed for network management associated with passive network taps using RFID. For example, a chassis (e.g., a frame or other physical structure) may include multiple bays or slots for inserting passive network taps or other hardware and an RFID reader module including one or more RFID readers. In this example, each slot may be associated with an RFID reader that is configured to read data from an RFID tag associated with a passive network tap (e.g., when the passive network tap is inserted in the respective slot). In some embodiments, each RFID reader may read information stored on an RFID tag and may provide the stored information and/or other discernible information (e.g., a slot identifier may be discernible based on the RFID reader and its associated slot location) to at least one processor associated with the RFID reader module, where the processor is capable of communicating with a management system, such as an inventory management system or a network management.

Advantageously, in accordance with some aspects of the subject matter described herein, a chassis in accordance with some aspects described herein may locate and/or identify passive network taps using RFID technologies. Further, by using known information about the physical locations of RFID readers, slot information associated with passive network taps may be discernible. For example, by using a particular configuration of low interference, short ranged, and/or directional antennas, an RFID reader and/or a related processor may be able to discern a location of a passive network tap based on the RFID reader that reads the RFID tag associated with the passive network tap using a known location of the RFID reader.

In accordance with some aspects of the subject matter described herein, tap related information may be obtained and communicated to an external management system without requiring each passive network tap in a chassis to include the hardware and software necessary to communicate directly with an external management system, which generally requires a power module and a communications related processor. Instead, in some embodiments described herein, each passive network tap may be associated with a passive (i.e., unpowered) RFID tag that is encoded with tap related information. In such embodiments, an RFID reader module as described herein may include one or more RFID readers for energizing and for reading the tap related information stored in the RFID tags. The RFID reader module may also include at least one processor and a related communications interface for communicating obtained tap related information to an external management system. By using a powered RFID reader module, individual passive network taps may be upgraded or replaced over time without impacting an external management system interface facilitated by the RFID reader module. Further, the RFID reader module may be upgraded or modified (e.g., to communicate with a different external management system, to communicate using a different protocol, etc.) without impacting the passive network taps.

Figure 1B:
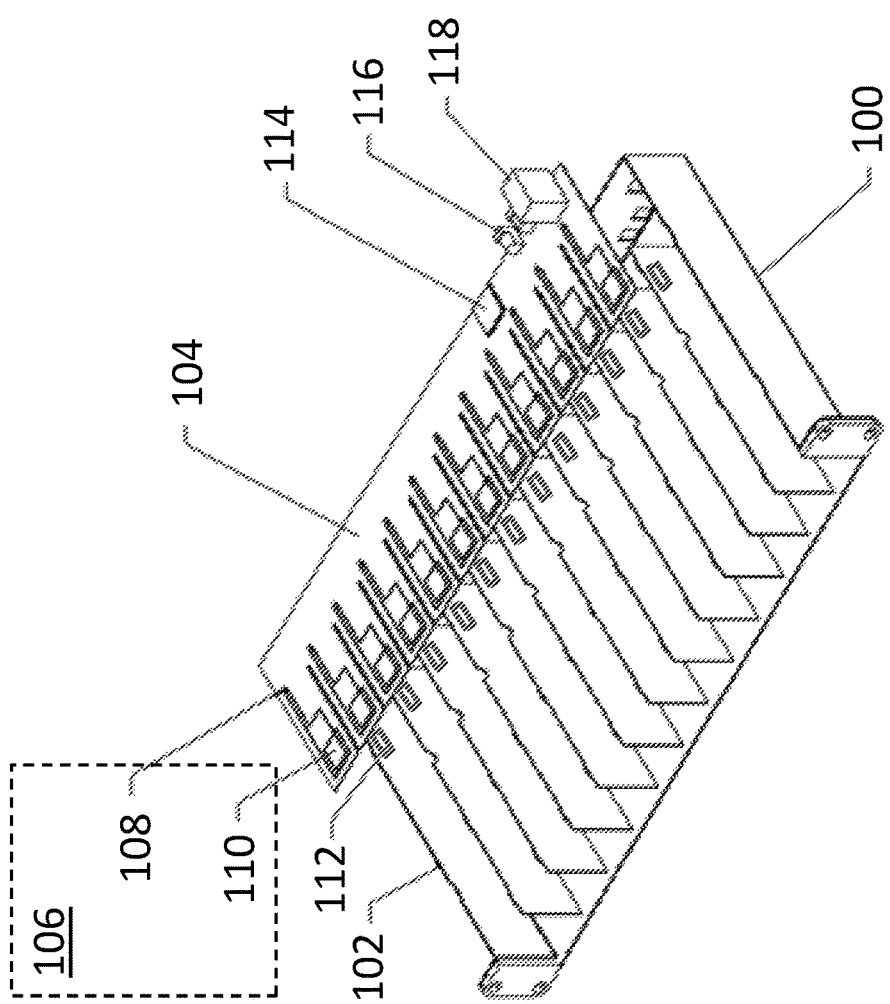

FIGS. 1A-1B are diagrams illustrating a chassis 100 for obtaining information about passive network taps according to an embodiment of the subject matter described herein. FIG. 1A depicts a rear perspective view of chassis 100. Chassis 100 may represent any case, frame, rack, enclosure, or other physical structure for one or more hardware or related units, such as passive network taps 102 (e.g., unpowered network taps). For example, chassis 100 may represent, include, or define an enclosure usable for mounting into a rack or rack-like structure, e.g. using rails, clips, and/or screws. In this example, a bottom side, a top side, and a back side of chassis 100 may be substantially enclosed, while a front side of chassis 100 may be substantially opened or unenclosed for allowing removal or inserting of one or more hardware or related equipment into chassis 100, such as network taps or other card-like equipment. Continuing with this example, a back side of chassis 100 may also include openings and/or connectors for power cable(s) and/or communications links.

FIG. 1B depicts a front perspective view of chassis 100 without a top side of chassis 100. In some embodiments, various labeled elements (e.g., parts, equipment, components, etc.) described herein may be included inside or within chassis 100. Referring to FIG. 1B, chassis 100 include multiple mounting slots or bays, where each slot is designed to hold a hardware unit, e.g. using rails, clips, and/or screws. In this example, chassis 100 or a related module may be configured to use RFID technologies to detect and/or read RFID tags associated with one or more slots in chassis 100.

Referring to FIG. 1B, chassis 100 may include slots (e.g., bays) for one or more passive network taps 102 and an RFID reader module 104. Passive network taps 102 may represent any suitable entities (e.g., a circuit card assembly (CCA), an integrated circuit (IC), a circuit board, a network interface card (NIC), or a physical or hardware device) for passively copying network data (e.g., traversing a tapped link) and/or for providing copied data to various entities. In some embodiments, one or more passive network taps 102, such as unpowered optical network taps, may be implemented as a module that includes a small CCA or circuit board. In such embodiments, the CCA or circuit board may include a physical connector for connecting to a tapped link (e.g., an optical fiber) and a physical connector for connecting to a link for communicating copied data.

In some embodiments, passive network taps 102 maybe be inserted or deployed in slots within chassis 100. In some embodiments, passive network taps 102 may lack a dedicated power source (e.g., a power port and/or related module for receiving power). For example, a passive or unpowered optical tap may copy data from a connected optical cable using passive (e.g., unpowered) tap technologies.

In some embodiments, passive network taps 102 may be associated with RFID tags 112. For example, each of passive network taps 102 may be connected (e.g., physically and/or communicatively coupled) to one or more RFID tags 112. In this example, each of RFID tag 112 may be attached to a passive network tap using an adhesive-based mounting strip. In another example, an RFID tag 112 may be associated with multiple passive network taps 102.

In some embodiments, RFID tags 112 may include tap related information, e.g., information associated with passive network taps 102. For example, a passive RFID tag 112 may be encoded with information that can be used to identify and/or provide information about an associated passive network tap 102. Some examples of tap related information may include tap presence/absence information, slot location information, geographical or site related information, a port number, a model number, a version number, a date of manufacture, a location of manufacture, component information, functional capabilities, and/or other information.

RFID reader module 104 may represent any suitable entity (e.g., an integrated circuit (IC), a circuit board, an enclosure, a substrate, or a physical device) that includes RFID readers 106 and/or other elements for performing various aspects associated with obtaining information about passive network taps 102. In some embodiments, RFID reader module 104 may include one or more RFID readers 106, a processor 114, a power module 116, and/or a communications module 118.

Figure 2:
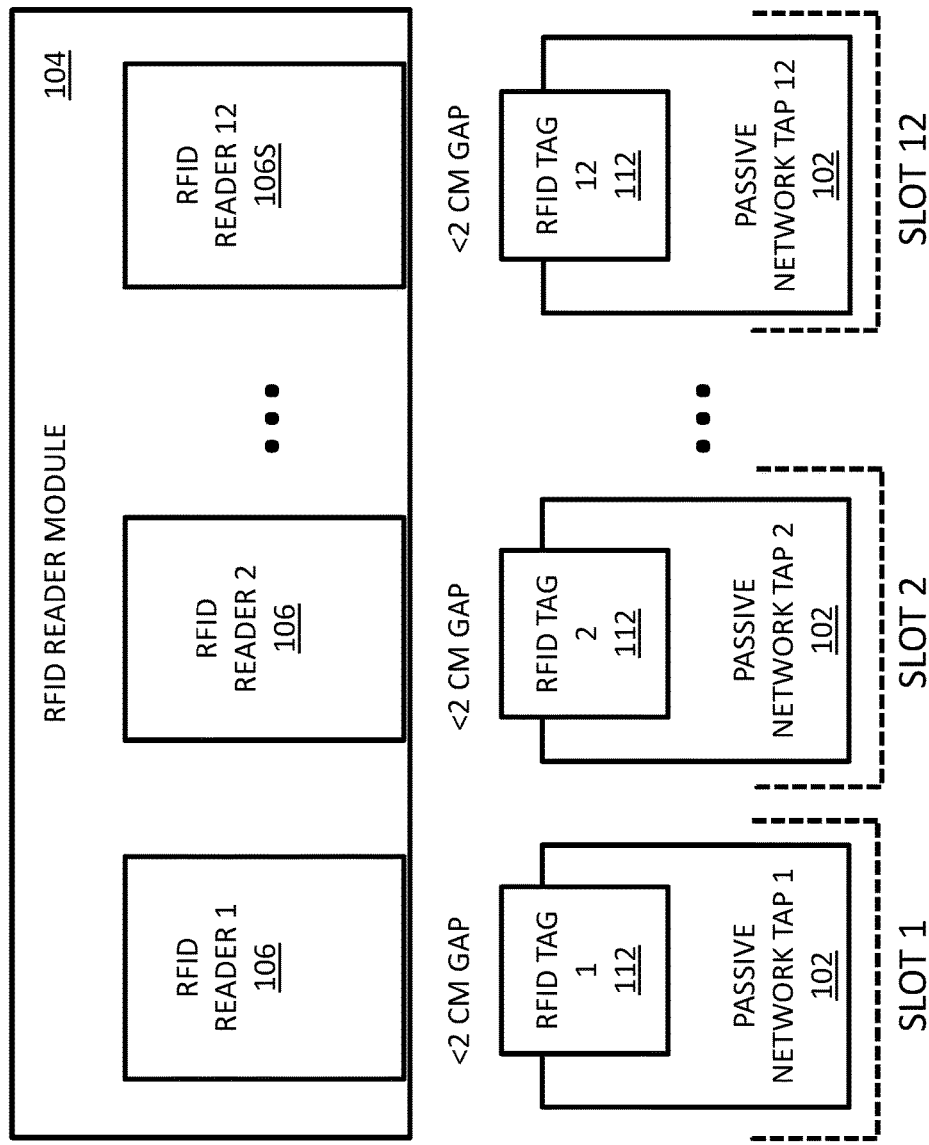
FIG. 2 is a diagram illustrating a radio frequency identification (RFID) reader module according to an embodiment of the subject matter described herein.

In some embodiments, RFID reader module 104 may be mounted or attached above or near slots in chassis 100. For example, as depicted in FIGS. 1 and 2, RFID reader module 104 may include multiple active RFID readers 106, where each of RFID readers 106 is configured to read a passive RFID tag located on or near a passive network tap. In this example, each RFID reader is positioned within RFID reader module 104 so as to be aligned with and/or adjacent to a particular slot in chassis 100 and/or a passive network tap and an associated RFID tag therein.

RFID readers 106 may represent any suitable entities (e.g., an integrated circuit (IC), a circuit board, or a physical device) for energizing and/or reading one or more of RFID tags 112. In some embodiments, some of RFID readers 106 may include an RF module 108 and an antenna 110. For example, RF module 108 may represent any suitable entity (e.g., hardware and software) for using antenna 110 to read of an RFID tag 112.

Antenna 110 may represent any suitable entities for wirelessly energizing an RFID tag 112 and/or for wirelessly reading data stored in the RFID tag 112. In some embodiments, antenna 110 may be external or internal to RF module 108. In some embodiments, external antenna may be an actual component or in form of signal traces on the printed circuit board. In some embodiments, antenna 110 may be highly directional and/or short ranged so as to better achieve isolation and/or minimize interference, e.g., when the same radio frequency is used by multiple RFID readers 106 in RFID reader module 104. For example, RFID tags 112 and corresponding RFID readers 106 may be less than 2 centimeters (cm) apart from each other. In this example, antenna 110 may operate at or near frequencies between about 125 kilohertz (kHz) and about 13.56 megahertz (MHz).

Processor 114 may represent any suitable entities (e.g., one or more physical or hardware implemented processors) for executing software (e.g., executable instructions). Processor 114 may be usable for receiving tap related information from RFID readers 106 and/or for communicating tap related information to one or more external management systems, e.g., via communications module 118. For example, processor 114 may receive an SNMP request from an external management system for requesting information about passive network taps 102 in chassis 100. In this example, in response to receiving the SNMP request, processor 114 may select and send relevant information about the passive network taps to the external management system using an SNMP response, e.g., via communications module 118.

In some embodiments, processor 114 may maintain and/or access information usable for identifying physical locations of RFID readers 106, e.g., slot positions or related slot identifiers, in chassis 100. For example, physical locations of RFID readers may be stored in an embedded memory or a stand-alone memory associated with RFID reader module 104. In this example, by knowing physical locations of RFID readers 106 and/or associated slots, processor 114 may determine a slot location associated with passive network tap 1 102 based on which RFID reader 106 detects or reads an RFID tag 112 associated with the passive network tap.

Power module 116 may represent any suitable entity (e.g., a connection or port) for receiving power or electricity, e.g., via a power cord or cable, and for providing the power to various elements or components associated with RFID reader module 104, e.g., processor 114 and RFID readers 106. For example, power module 116 may be used to power various RFID readers 106 and processor 114.

Communications module 118 may represent any suitable entity (e.g., a connection or port) for facilitating communications between processor 114 and external management systems or other entities. For example, communications module 118 may include a console and/or management port connected to an IP network. In this example, communications module 118 may facilitate communications of SNMP or other management related messages between processor 114 and one or more external management systems.

It will be appreciated that FIGS. 1A-1B are for illustrative purposes and that various depicted entities, their locations, and/or their functions described above in relation to FIGS. 1A-1B may be changed, altered, added, or removed.

FIG. 2 is a diagram illustrating RFID reader module 104 according to an embodiment of the subject matter described herein. In some embodiments, RFID reader module 104 may be mounted or attached to chassis 100 and may include one or more RFID readers 106 for reading RFID tags 112 associated with passive network taps 102 in chassis 100. For example, RFID reader module 104 may be mounted above or below slots in chassis 100 where passive network taps 102 are to be inserted.

In some embodiments, where a physical position or a location of each RFID reader 106 within RFID reader module 104 may be known or discernible and where each RFID reader 106 is responsible for a single slot in chassis 100, a physical position or a location of each passive network tap 102 and/or a related communications port being tapped (e.g., a network port, a tool port, etc.) can be inferred. In such embodiments, position and/or location information associated with RFID readers 106 may be provisioned or provided by an equipment operator or a network operator, e.g., at the time RFID reader module 104 is mounted to chassis 100.

In some embodiments, RFID reader module 104 may include a single RFID reader 106 for energizing and reading all of RFID tags 112. In this example, to discern slot location information and/or port information associated with passive network taps 102, the information may be stored or encoded in associated RFID tags 112.

Referring to FIG. 2, RFID reader module 104 may include RFID readers 106. Each of RFID readers 106 may be aligned with a different slot in chassis 100. For example, RFID reader 1 106 may be aligned with slot 1 of chassis 100, RFID reader 2 106 may be aligned with slot 2 of chassis 100, and RFID reader 12 106 may be aligned with slot 12 of chassis 100. In some embodiments, each RFID reader 106 may be positioned and/or configured to be near or adjacent to an RFID tag 112 when a passive network tap 102 is inserted into a corresponding slot. For example, RFID reader 1 106 may use a directional and/or short ranged antenna 110 to energize and read an adjacent (e.g., near) RFID tag 112 without energizing and reading other RFID tags 112 associated with different slots.

In some embodiments, RFID reader module 104 may include less RFID readers 106 than slots in chassis 100. For example, RFID reader 2 106 may be configured to read multiple RFID tags 112 associated with multiple passive network taps 102 and slots. In this example, RFID reader 2 106 may provide information about passive network tap 2 102 and passive network tap 3 102 (not shown).

In some embodiments, passive network taps 102 may include RFID tags 112 containing tag related information. For example, passive network tap 1 102 may be associated with RFID tag 1 112. In this example, RFID tag 1 112 may indicate a serial number, a model number, a date of manufacture, a location of manufacture, tap capabilities, and/or other information regarding network tap 1 102. In another example, passive network tap 2 102 may be associated with RFID tag 2 112. In this example, RFID tag 2 112 may indicate a serial number, a model number, a date of manufacture, a location of manufacture, tap capabilities, and/or other information regarding network tap 2 102. In some embodiments, tap related information stored in RFID tags 112 may be static and cross referenced with unique tag related identifiers.

In some embodiments, after reading tap related information stored in RFID tags 112, RFID readers 106 may be configured to communicate with processor 114. For example, processor 114 may receive information from RFID readers 106 and may store, aggregate, and/or process the information for various purposes, e.g., retrieval by one or more external management systems.

It will be appreciated that FIG. 2 is for illustrative purposes and that various depicted entities, their locations, and/or their functions described above in relation to FIG. 2 may be changed, altered, added, or removed.

Figure 3:
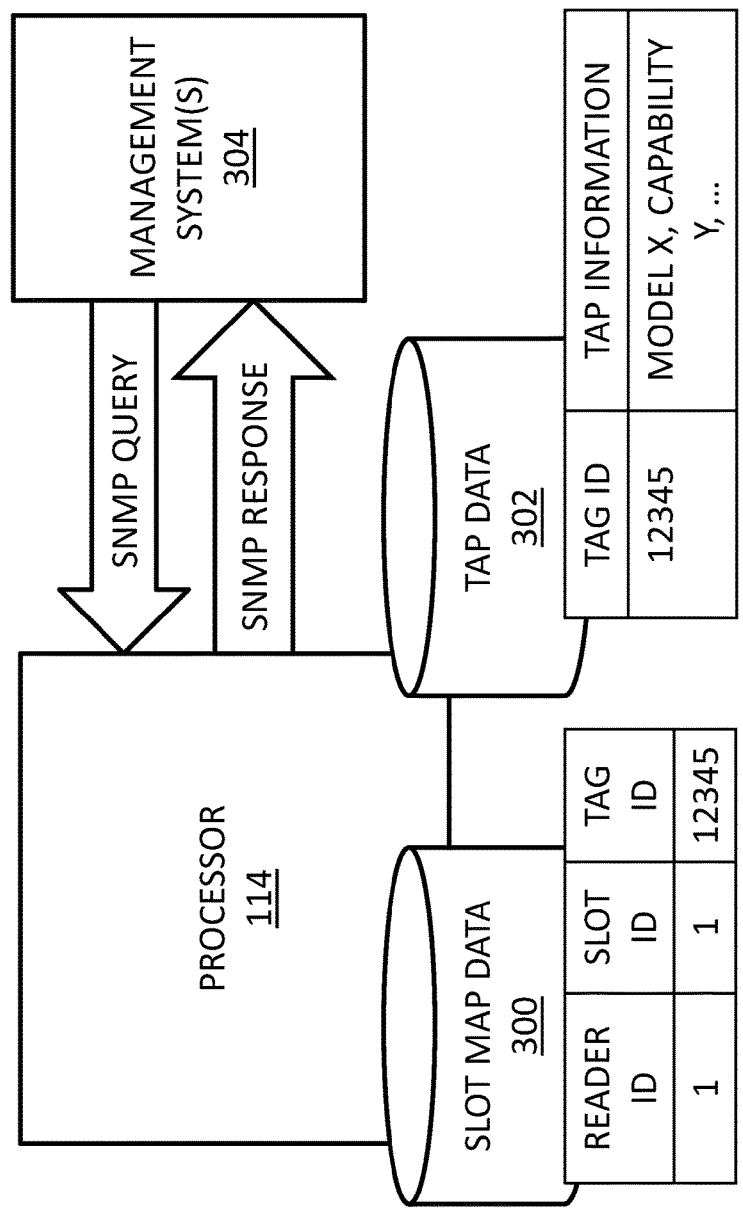
FIG. 3 is a diagram illustrating communications associated with tap related management according to an embodiment of the subject matter described herein.

FIG. 3 is a diagram illustrating communications associated with tap related management according to an embodiment of the subject matter described herein. In some embodiments, processor 114 may interact with one or more management system(s) 304 to provide information about passive network taps 102. For example, an external management system 304 may send a SNMP query to processor 114 for requesting data associated with a passive network tap 102. In this example, processor 114 may query one or more data structures containing slot map data 300 and tap data 302 for relevant tap related information and may use this information in an SNMP response to external management system 304.

Referring to FIG. 3, slot map data 300 may be depicted using a table where each row represents an RFID reader identifier, a slot identifier, and a tag identifier associated with a particular passive network tap 102. For example, each row may comprise columns and/or fields for an RFID reader identifier, a slot identifier, and a tag identifier.

A 'READER ID' field may comprise a value, a name, and/or a related identifier for indicating a particular RFID reader 106. For example, a 'READER ID' field value may include a unique number or name, such as '1', '2', and '3'. In another example, a 'READER ID' field value may be hierarchical and may include a first portion that represents a chassis and a second portion that represents an RFID reader identifier, e.g., 'CHASSISX-R1', 'CHASSISX-R2', and 'CHASSISZ-R3'.

A 'SLOT ID' field may comprise a value, a name, and/or a related identifier for indicating a particular slot in chassis 100. For example, a 'SLOT ID' field value may include a unique number or name, such as '1', '2', and '3'. In another example, an 'ID' field value may be hierarchical and may include a first portion that represents a chassis and a second portion that represents a slot identifier, e.g., 'CHASSISX-S1', 'CHASSISY-S2', and 'CHASSISZ-S3'.

A 'TAG ID' field may comprise a value, a name, and/or a related identifier for indicating a particular RFID tag 112 associated with a passive network tap 102. For example, a 'TAG ID' field value may include a unique number or name, such as '12345', '12346', and '12347'. In another example, an 'ID' field value may be hierarchical and may include a first portion that represents a chassis and a second portion that represents a tap identifier, e.g., 'CHASSISX-TAP1', 'CHASSISX-TAP2', and 'CHASSISZ-TAP3'.

Tap data 302 may be depicted using a table where each row represents an RFID tag identifier and tap related information associated with an associated passive network tap. For example, each row may comprise columns and/or fields for a tag identifier and tap related information. In some embodiments, a tag identifier from slot map data 300 may be used an index value or key for identifying relevant tap related information associated with a passive network tap 102.

A 'TAG ID' field may comprise a value, a name, and/or a related identifier for indicating a particular RFID tag associated with a passive network tap. For example, a 'TAG ID' field value may include a unique number or name, such as '12345', '12346', and '12347'. In another example, an 'ID' field value may be hierarchical and may include a first portion that represents a chassis and a second portion that represents a tap identifier, e.g., 'CHASSISX-TAP1', 'CHASSISX-TAP2', and 'CHASSISZ-TAP3'.

A 'TAP INFORMATION' field may comprise one or more values, text, and/or data structures for indicating attributes, characteristics, and/or capabilities associated with a passive network tap. For example, a 'TAP INFORMATION' field value may include a model type, a serial number, a model number, a date of manufacture, a location of manufacture, network speed information, a split ratio, and/or insertion loss information. In this example, the information indicated by the 'TAP INFORMATION' field value may be static and/or generally remain the same for the life of the passive network tap. In another example, 'TAP INFORMATION' field value may include dynamic or changing information, e.g., a slot identifier and/or network statistics associated with a particular passive network tap.

In some embodiments, slot map data 300 and/or tap data 302 may be accessible by RFID reader 106, processor 114, and/or another module or entity. In some embodiments, slot map data 300 and/or tap data 302 may be stored using various data structures in a memory or a storage device associated with processor 114.

In some embodiments, some of slot map data 300 and/or tap data 302 may be predetermined or known prior to passive network taps 102 being inserted in chassis 100. For example, prior to reading an RFID tag 1 112 associated with passive network taps 102, a memory or data storage device (e.g., accessible to processor 114) may include information indicating which RFID reader 106 is associated with which slot of chassis 100. In this example, this assignment or positioning information may be provisioned or provided by a network operator or an equipment manufacturer, e.g., after RFID reader module 104 is coupled (e.g., physically or communicatively) to chassis 100. In another example, tap data 302 may include information stored in RFID tag 1 112. In this example, attributes or other information about passive network tap 1 102 may be written to RFID tag 1 112 (e.g., by a tap manufacturer, a network operator, or another entity).

In some embodiments, some of slot map data 300 and/or tap data 302 may be determined dynamically or in response to triggers, e.g., RFID related triggers or a SNMP query message. For example, after inserting passive network tap 1 102 into a first slot of chassis 100, RFID reader 1 106 may read RFID tag 1 112 associated with the inserted passive network tap. In this example, RFID reader 1 106 may send a tag identifier and/or other information read from the RFID tag 1 112 to processor 114 and processor 114 may update slot map data 300 to indicate that the tag identifier is associated with an RFID reader 1 106 and a first slot. Continuing with this example, if passive network tap 1 102 is removed and inserted into a second slot of chassis 100, RFID reader 2 106 may trigger processor 114 to update slot map data 300 to indicate that the tag identifier is associated with an RFID reader 2 106 and a second slot.

It will be appreciated that the communications and/or actions depicted in FIG. 3 are for illustrative purposes and that different and/or additional communications and/or actions than those depicted in FIG. 3 may be used for obtaining information about passive network taps 102.

Figure 4:
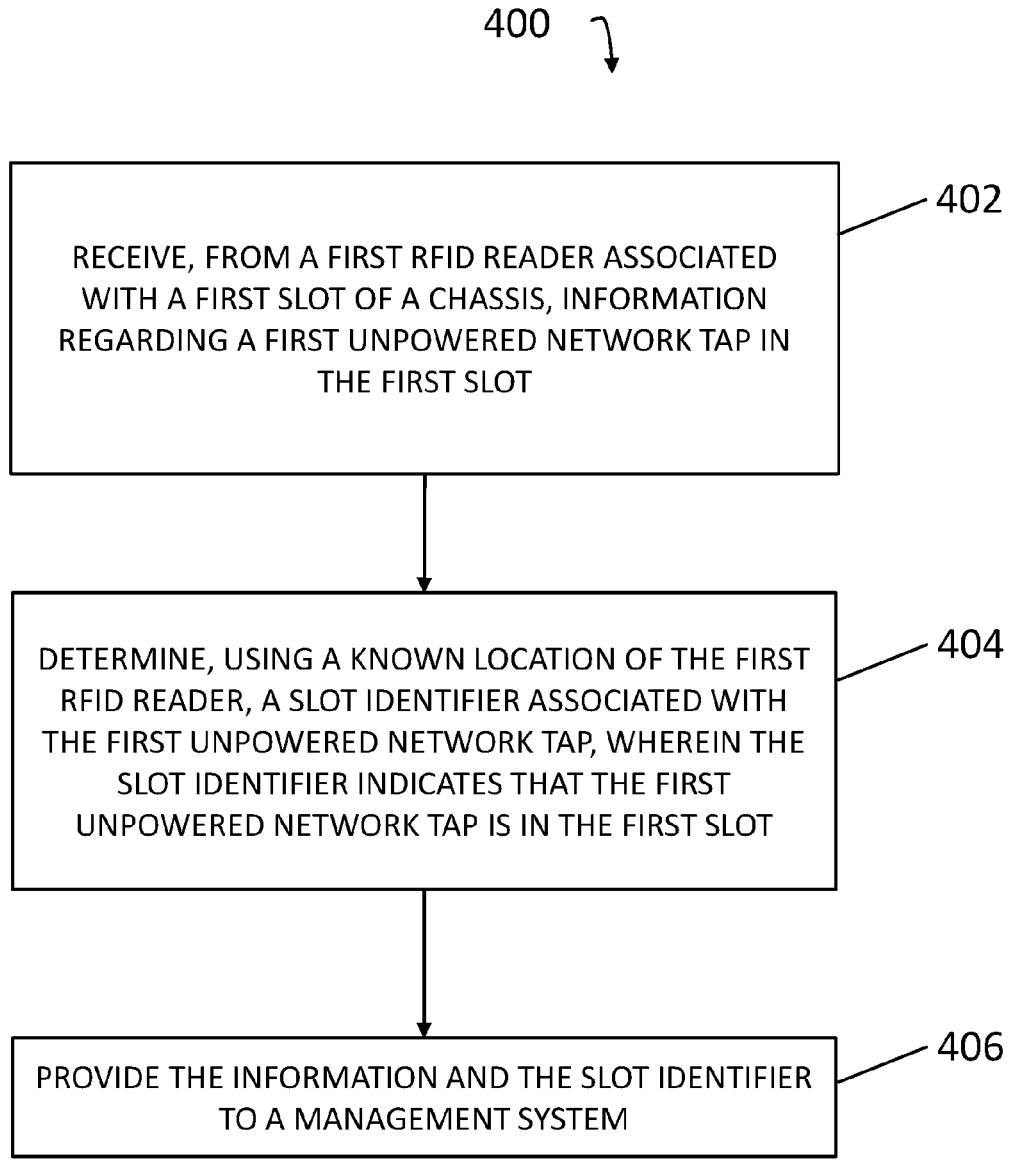
FIG. 4 is a diagram illustrating a process for obtaining information about passive network taps according to an embodiment of the subject matter described herein.

FIG. 4 is a diagram illustrating a process 400 for obtaining information about passive network taps 102 according to an embodiment of the subject matter described herein. In some embodiments, process 400, or portions thereof, may be performed by or at chassis 100, RFID reader module 104, one of RFID readers 106, processor 114, and/or another node or module. For example, process 400 may occur at chassis 100. In this example, chassis 100 may contain one or more slots for passive network taps 102 and may be associated with RFID reader module 104.

In some embodiments, RFID reader module 104 may be located within an enclosure defined by chassis 100 and RFID reader module 104 may include one or more RFID readers located within the enclosure, wherein the one or more RFID readers are configured to read data stored in RFID tags associated with one or more unpowered network taps located in the one or more slots for passively copying data in a network Referring to process 400, in step 402, information regarding a first unpowered network tap in a first slot of a chassis may be received from a first RFID reader associated with the first slot of the chassis. For example, RFID reader 1 106 may read information encoded on RFID tag 1 112 associated with passive network tap 1 102.

In step 404, a slot identifier associated with the first unpowered network tap may be determined using a known location of the first RFID reader. For example, a slot identifier may indicate that the first unpowered network tap is in the first slot. In this example, the slot identifier may be determined by using slot map data 300 and identifying the slot identifier associated with the RFID reader that read an RFID tag associated with the first unpowered network tap.

In step 406, the information and the slot identifier may be provided to a management system. For example, tap related information may be provided to a network management system or inventory management system external to chassis 100.

In some embodiments, an RFID reader may use a directional antenna to minimize interference with other RFID readers. For example, RFID reader 2 106 may use a directional antenna to read RFID tag 2 112 without reading RFID tags associated with other slots, such as RFID tag 1 112 and RFID tag 3 112.

In some embodiments, a first RFID reader may use a short range frequency covering less than 2 centimeters or a frequency range between about 125 kilohertz (kHz) and about 13.56 megahertz (MHz). For example, RFID reader 1 106 may include an internal antenna 110 that operates at 125 kHz, while RFID reader 2 106 may include an external antenna 110 that operates at 13.56 MHz.

In some embodiments, a first RFID reader may use an internal antenna or an external antenna. For example, RFID reader 106 may include RF module 108 with an integrated antenna 110. In another example, RFID reader may include a RF module and an external antenna 110 connected to the RF module. In some embodiments, external antenna may be an actual component or in form of signal traces on the printed circuit board.

In some embodiments, an unpowered network tap may include an optical network tap. For example, passive network tap 1 102 may include an optical splitter and may copy data from optical link without using a power source when performing the copying.

In some embodiments, an RFID tag (e.g., RFID tag 1 112) may include static information associated with a first unpowered network tap (e.g., passive network tap 1 102) and one or more unique identifiers for identifying the RFID tag. For example, static information may include a model type, a serial number, a model number, a date of manufacture, a location of manufacture, network speed information, a split ratio, and/or insertion loss information.

In some embodiments, information about an unpowered network tap may be provided to a management system in response to receiving a tap related information request from the management system. For example, processor 114 may receive a request from an external network management system requesting information about passive network taps 102 in chassis 100. In this example, in response to receiving the request, processor 114 may send relevant information about the passive network taps 102 to the network management system, e.g., via communications module 118.

In some embodiments, an RFID reader may read RFID tags associated with two or more unpowered network taps in chassis 100. For example, RFID reader 2 106 may read static information stored in RFID tag 2 112 and RFID tag 3 112.

It will be appreciated that process 400 is for illustrative purposes and that different and/or additional actions may be used. It will also be appreciated that various actions described herein may occur in a different order or sequence.

It should be noted that chassis 100, RFID reader module 104, RFID reader 106, processor 114, and/or functionality described herein may constitute a special purpose computing device. Further, chassis 100, RFID reader module 104, RFID reader 106, processor 114, and/or functionality described herein can improve the technological field of managing unpowered network taps by using RFID technologies. For example, by using an RFID reader module to read RFID tags associated with one or more slots in chassis 100, information about passive network tap 102 inserted in chassis 100 can be obtained and provided to external management systems.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for obtaining information regarding unpowered network taps, the method comprising:
   in a chassis defining an enclosure and containing two or more slots,
      providing a radio frequency identification (RFID) reader module comprising a first RFID reader and a second RFID reader located within the enclosure, wherein the first RFID reader is configured to read RFID tag data associated with a first slot of the chassis and the second RFID reader is configured to read RFID tag data associated with a second slot of the chassis and to read RFID tag data associated with a third slot of the chassis;

receiving, from the second RFID reader, information regarding a first unpowered network tap in the second slot;

determining, using a known location of the second RFID reader and the information regarding the first unpowered network tap, a slot identifier associated with the first unpowered network tap, wherein the slot identifier indicates that the first unpowered network tap is in the second slot; and providing the information and the slot identifier to a management system.

2. The method of claim 1 wherein the first RFID reader uses a directional antenna.

3. The method of claim 1 wherein the first RFID reader uses a frequency for covering a range of less than 2 centimeters or uses a frequency between 125 kilohertz (kHz) and 13.56 megahertz (MHz).

4. The method of claim 1 wherein the first RFID reader uses an internal antenna or an external antenna.

5. The method of claim 1 wherein the first unpowered network tap includes an optical network tap.

6. The method of claim 1 wherein a first RFID tag associated with the first unpowered network tap includes static information associated with the unpowered first network tap and one or more unique identifiers for identifying the first RFID tag.

7. The method of claim 6 wherein the static information includes a model type, a serial number, a model number, a date of manufacture, a location of manufacture, network speed information, a split ratio, and/or insertion loss information.

8. The method of claim 1 wherein providing the information and the slot identifier to the management system is in response to receiving a request for the information from the management system.

9. A system for obtaining information regarding unpowered network taps, the system comprising:

a chassis defining an enclosure and containing two or more slots;

a radio frequency identification (RFID) reader module comprising at least one processor and a first RFID reader and a second RFID reader located within the enclosure, wherein the first RFID reader is configured to read RFID tag data associated with a first slot of the chassis and the second RFID reader is configured to read RFID tag data associated with a second slot of the chassis and to read RFID tag data associated with a third slot of the chassis; and wherein the RFID reader module is configured to receive, from the second RFID read, information regarding a first unpowered network tap in the second slot, to determine, using a known location of the second RFID reader and the information regarding the first unpowered network tap, a slot identifier associated with the first unpowered network tap, wherein the slot identifier indicates that the first unpowered network tap is in the second slot, and to provide the information and the slot identifier to a management system.

10. The system of claim 9 wherein the first RFID reader uses a directional antenna.

11. The system of claim 9 wherein the first RFID reader uses a frequency for covering a range of less than 2 centimeters or uses a frequency between 125 kilohertz (kHz) and 13.56 megahertz (MHz).

12. The system of claim 9 wherein the first RFID reader uses an internal antenna or an external antenna.

13. The system of claim 9 wherein an external antenna includes signal traces on a printed circuit board.

14. The system of claim 9 wherein the first unpowered network tap includes an optical network tap.

15. The system of claim 9 wherein a first RFID tag associated with the first unpowered network tap includes static information associated with the first unpowered network tap and one or more unique identifiers for identifying the first RFID tag.

16. The system of claim 15 wherein the static information includes a model type, a serial number, a model number, a date of manufacture, a location of manufacture, network speed information, a split ratio, and/or insertion loss information.

17. The system of claim 9 wherein the at least one processor is configured to provide the information and the slot identifier to the management system is in response to receiving a request for the information from the management system.

18. A non-transitory computer readable medium having stored thereon executable instructions embodied in the computer readable medium that when executed by at least one processor of at least one computer cause the at least one computer to perform steps comprising:

in a chassis defining an enclosure and containing two or more slots, providing a radio frequency identification (RFID) reader module comprising a first RFID reader and a second RFID reader located within the enclosure, wherein the first RFID reader is configured to read RFID tag data associated with a first slot of the chassis and the second RFID reader is configured to read RFID tag data associated with a second slot of the chassis and to read RFID tag data associated with a third slot of the chassis;

receiving, from the second RFID reader, information regarding a first unpowered network tap in the second slot;

determining, using a known location of the second RFID reader and the information regarding the first unpowered network tap, a slot identifier associated with the first unpowered network tap, wherein the slot identifier indicates that the first unpowered network tap is in the second slot; and providing the information and the slot identifier to a management system.

* * * * *

UNITED STATES PATENT AND TRADEMARK OFFICE
CERTIFICATE OF CORRECTION

PATENT NO. : 10,165,390 B2
APPLICATION NO. : 15/067128
DATED : December 25, 2018
INVENTOR(S) : Marcel Felix Desdier et al.

It is certified that error appears in the above-identified patent and that said Letters Patent is hereby corrected as shown below:

On the Title Page

In item (71), in Column 1, in "Applicant", Line 1, delete "Ixia, Calabasas, CA (US)" and insert -- Keysight Technologies Singapore (Holdings) Pte. Ltd., Minneapolis, MN (US) --, therefor.

In item (73), in Column 1, in "Assignee", Line 2, delete "(HOLDLNGS)" and insert -- (HOLDINGS) --, therefor.

In the Claims

In Column 11, Line 56, in Claim 9, delete "read," and insert -- reader, --, therefor.

Signed and Sealed this
Twentieth Day of August, 2019

Andrei Iancu
*Director of the United States Patent and Trademark Office*